Nov. 16, 1954 F. LEE 2,694,579
DISINTEGRATING CYLINDER FOR MANURE SPREADING VEHICLES
Filed Nov. 8, 1950 2 Sheets-Sheet 2
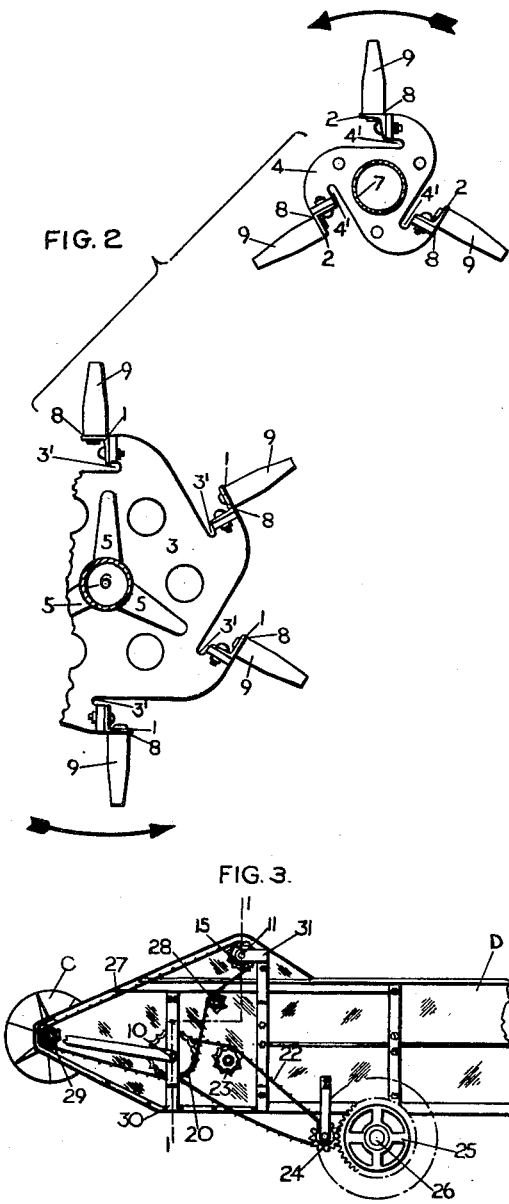
Inventor
Francis Lee

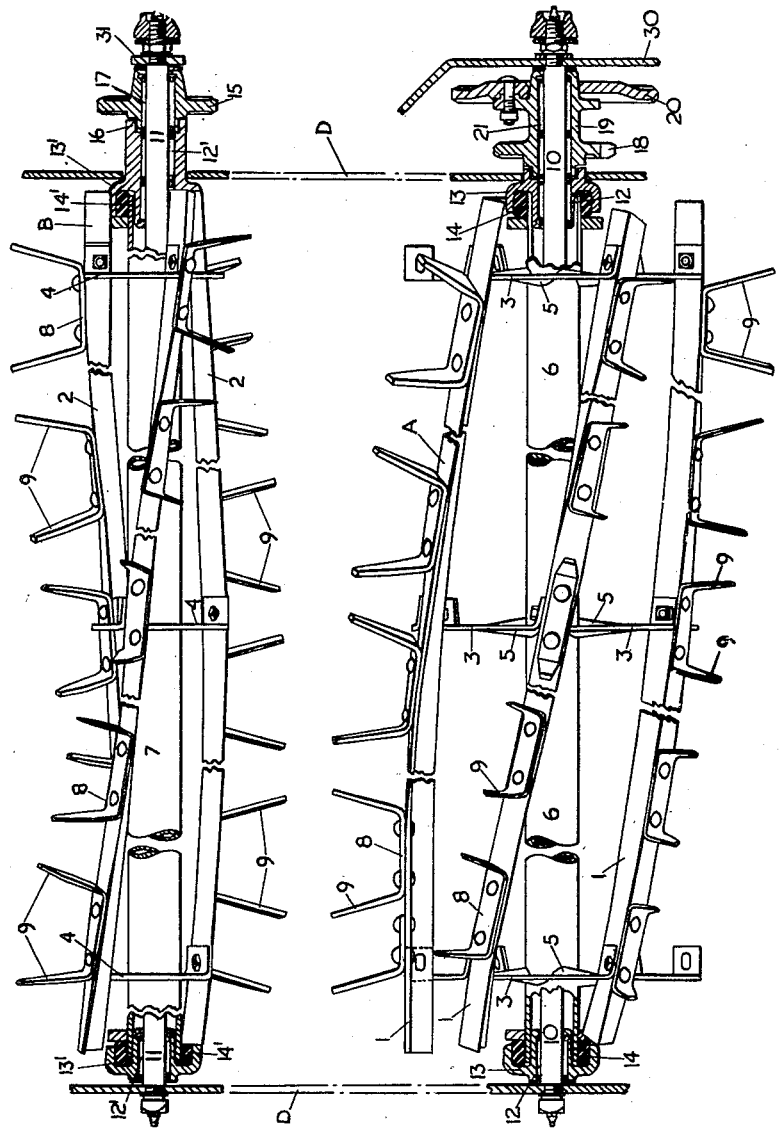

United States Patent Office 2,694,579
Patented Nov. 16, 1954

2,694,579

DISINTEGRATING CYLINDER FOR MANURE SPREADING VEHICLES

Francis Lee, Stretford, England, assignor to Massey-Harris-Ferguson (Manufacturing) Limited, a company of Great Britain Application November 8, 1950, Serial No. 194,615

1 Claim. (Cl. 275—3)

This invention relates to improvements in manure spreaders and breakers for agricultural trailers.

The manure is transported in a trailer having an apron chain feed along the bottom to remove the manure towards the rear. The manure is lifted from the trailer by a plurality of rotary spreaders which break up the manure and distribute it over the ground rearwardly of the trailer.

According to the invention rotary spreaders in the form of cylinders arranged transversely of the trailer are constructed of a plurality of spaced bars arranged spirally of the cylinder, a series of U-shaped teeth being bolted to each bar.

The invention will be described with reference to the accompanying drawings:

Fig. 1 is a front elevation of the top and bottom spreaders showing the bearings and driving pinion in section on line 1—1 of Fig. 3;

Fig. 2 is a part elevation of the discs showing the spreaders mounted thereon;

Fig. 3 is a side elevation of part of the trailer showing the drive for the spreaders.

The manure is lifted from an apron travelling along the bottom of a vehicle or trailer D by a lower rotary spreader A and broken up or disintegrated by traversing between the spreader A and a second upper rotary spreader B from which it is transferred to a rotary distributor C arranged at the tail end of the trailer from which it is distributed over the ground rearwardly of the trailer.

Each spreader A, B comprises a plurality of bars, 1, 2 preferably of angle section mounted on discs 3, 4 to form open cylinders with the bar 1, 2 extending spirally between the discs 3 and 4. Three or other number of discs 3 and 4 may be provided, each disc being formed with notches $3^1$ and $4^1$ around their peripheries, one edge of each notch $3^1$ or $4^1$ being bent at an angle corresponding to the spiral angle of the bars 1 and 2 to form flanges through which the bars 1 and 2 respectively may be bolted thereto. Ribs 5 are provided on the discs 3 for stiffening purposes. The discs 3 and 4 are supported on hollow shafts 6 and 7 for each spreader A and B. A plurality of teeth 8 are bolted to the bars 1 and 2 each tooth 8 being of U shape to provide two prongs 9, the ends of which are pointed to break up the straw in the manure. The prongs 9 may be elliptical or bottle shaped. The teeth 8 on the bars 1 and 2 may be staggered in relation to those on adjacent bars.

The cylindrical spreaders A and B rotate on stationary spindles 10, 11 which are mounted on the trailer D, and pass through the shafts 6 and 7, respectively. The spindles 10, 11 for the upper and lower spreaders A and B are mounted on roller bearings 12 and $12^1$ at each end carried in bearing housings 13, $13^1$ capable of rotating about the spindles 10 or 11, a resilient coupling 14, $14^1$ being provided between the end discs 3, 4 and the housings 13, $13^1$. The resilient couplings 14, $14^1$ serve the two purposes of absorbing the vibration and shock loads and of acting as self aligning bearings. A sprocket wheel 15 is coupled by dogs 16 to the bearing housing $13^1$ at one side of the upper spreader B, the sprocket wheel 15 rotating on roller bearings 17 on the spindle 11. The lower spreader A is driven through a sprocket wheel 18 engaging the lower bearing housing 13. The sprocket 18 is formed with a boss 19 bolted to a second sprocket wheel 20. The sprocket 18 and boss 19 rotate on roller bearings 21 on the spindle 10.

A driving chain 22 passes over the sprocket 18 on the lower spreader A, over a jockey sprocket 23 and over a sprocket 24 driven by a gear wheel 25 on a driving spindle 26. The upper spreader B is driven at a different speed from the lower spreader by a chain 27 passing over the sprocket 15 on the upper spreader B, over the sprocket 20 on the lower spreader A over a jockey sprocket 28 and over a sprocket 29 driving the distributor C.

The shaft 6 may be supported at one side of the trailer D on a bracket 30 bolted thereto. The shaft 7 may be supported on a bracket 31 also bolted to the trailer D at one side.

I claim:

A manure spreader for agricultural trailers having spaced side walls, comprising in combination, two spaced hollow shafts; bearing means secured to the end portions of said shafts; two parallel spaced spindles secured to the side walls of the trailer so as to extend transversely across the trailer, said spindles passing through said hollow shafts and supporting said bearing means so that said hollow shafts are rotatably mounted on said spindles; two sets of spaced discs each set of discs secured to one of said spaced shafts, each disc being formed along the perimeter thereof with transversely projecting spaced portions having radially extending faces; two sets of transversely extending bars having an L-shaped cross-section, said bars being secured with one leg thereof to said radially extending faces of said projecting disc portions and being arranged in spiral relation to the axis of rotation of the respective hollow shaft; a plurality of spaced U-shaped teeth secured to the other leg of each of said bars so as to project in a radial direction; driving sprocket wheels coupled to said bearing means; and chain means for driving said sprocket wheels.

References Cited in the file of this patent

UNITED STATES PATENTS

| Number | Name | Date |
|---|---|---|
| Re. 13,369 | Funk | Feb. 20, 1912 |
| 269,585 | Kemp | Dec. 26, 1882 |
| 1,324,540 | Bucklin | Dec. 9, 1919 |
| 1,328,618 | Cook | Jan. 20, 1920 |
| 1,488,661 | Bohmker | Apr. 1, 1924 |
| 1,945,125 | Swanson et al. | Jan. 30, 1934 |
| 2,239,448 | Selhorst | Apr. 22, 1941 |

FOREIGN PATENTS

| Number | Country | Date |
|---|---|---|
| 613,661 | Great Britain | Dec. 1, 1948 |